US008755405B2

(12) United States Patent
Kovvali et al.

(10) Patent No.: US 8,755,405 B2
(45) Date of Patent: Jun. 17, 2014

(54) BURST PACKET SCHEDULER FOR IMPROVED RAN EFFICIENCY IN UMTS/HSPA NETWORKS

(75) Inventors: Surya Kumar Kovvali, Westborough, MA (US); Ramakrishnan Krishnan, Hopkinton, MA (US); Ramji Raghavan, Winchester, MA (US); Ronald M. Parker, Boxborough, MA (US)

(73) Assignee: Movik Networks, Inc., Westford, MA (US)

( * ) Notice: Subject to any disclaimer, the term of this patent is extended or adjusted under 35 U.S.C. 154(b) by 308 days.

(21) Appl. No.: 12/942,913

(22) Filed: Nov. 9, 2010

(65) Prior Publication Data

US 2011/0116460 A1 May 19, 2011

Related U.S. Application Data

(60) Provisional application No. 61/259,458, filed on Nov. 9, 2009.

(51) Int. Cl.
*H04J 3/16* (2006.01)

(52) U.S. Cl.
USPC ............ 370/468; 370/230; 370/235; 370/253

(58) Field of Classification Search
USPC .................. 370/235, 395.4, 230, 253, 468
See application file for complete search history.

(56) References Cited

U.S. PATENT DOCUMENTS

| 5,990,810 | A | 11/1999 | Williams |
| 6,105,064 | A | 8/2000 | Davis et al. |
| 6,798,786 | B1 | 9/2004 | Lo et al. |
| 6,917,984 | B1 | 7/2005 | Tan |
| 7,047,312 | B1 | 5/2006 | Aweya et al. |
| 7,177,273 | B2 * | 2/2007 | Peelen et al. ............... 370/230 |
| 7,333,431 | B2 | 2/2008 | Wen et al. |
| 7,412,531 | B1 | 8/2008 | Lango et al. |
| 7,489,690 | B2 * | 2/2009 | Kakadia ..................... 370/395.4 |
| 7,568,071 | B2 | 7/2009 | Kobayashi et al. |
| 7,583,594 | B2 | 9/2009 | Zakrzewski |

(Continued)

FOREIGN PATENT DOCUMENTS

| CN | 1606302 A | 4/2005 |
| CN | 1774890 A | 5/2006 |

(Continued)

OTHER PUBLICATIONS

International Search Report dated Mar. 3, 2011.

(Continued)

*Primary Examiner* — Ricky Ngo
*Assistant Examiner* — Dewanda Samuel
(74) *Attorney, Agent, or Firm* — Nields, Lemack & Frame, LLC

(57) ABSTRACT

A method of generating optimal packet workload for achieving a balance between maximizing cell throughput and fairness across multiple users in UMTS/HSPA Network is disclosed. The packet scheduler of the current invention enhances the performance of other schedulers, such as Proportionally Fair Scheduler in NodeB and RNC in UMTS/HSPA Networks by monitoring recent RAN bandwidth to each mobile device, and increasing buffer occupancy of high rate data-flows in the RAN devices. The scheduler uses the desired performance goals of maximum cell throughput and fairness at various network congestion levels, and controls egress burst rate while delivering packets to the RAN (Radio Access Network).

24 Claims, 6 Drawing Sheets

(56) References Cited

U.S. PATENT DOCUMENTS

| | | | |
|---|---|---|---|
| 7,602,872 B2* | 10/2009 | Suh et al. | 375/357 |
| 7,710,873 B2* | 5/2010 | Pulkka et al. | 370/235 |
| 7,715,418 B2* | 5/2010 | Cho et al. | 370/412 |
| 7,734,804 B2* | 6/2010 | Lorenz et al. | 709/231 |
| 7,797,369 B2 | 9/2010 | Glickman | |
| 7,852,763 B2* | 12/2010 | Ghanadan et al. | 370/230.1 |
| 7,965,634 B2 | 6/2011 | Aoyanagi | |
| 7,991,905 B1 | 8/2011 | Roussos et al. | |
| 8,111,630 B2 | 2/2012 | Kovvali et al. | |
| 8,161,158 B2 | 4/2012 | Curcio et al. | |
| 8,190,674 B2 | 5/2012 | Narayanan et al. | |
| 8,208,430 B2 | 6/2012 | Valmikam et al. | |
| 8,576,744 B2 | 11/2013 | Kovvali et al. | |
| 2003/0003919 A1 | 1/2003 | Beming et al. | |
| 2003/0179720 A1 | 9/2003 | Cuny | |
| 2003/0195977 A1 | 10/2003 | Liu et al. | |
| 2004/0098748 A1 | 5/2004 | Bo et al. | |
| 2004/0193397 A1 | 9/2004 | Lumb et al. | |
| 2004/0223505 A1 | 11/2004 | Kim et al. | |
| 2004/0240390 A1 | 12/2004 | Seckin | |
| 2004/0258070 A1* | 12/2004 | Arima | 370/395.4 |
| 2004/0264368 A1 | 12/2004 | Heiskari et al. | |
| 2005/0033857 A1 | 2/2005 | Imiya | |
| 2005/0047416 A1 | 3/2005 | Heo et al. | |
| 2005/0117583 A1 | 6/2005 | Uchida et al. | |
| 2006/0019677 A1 | 1/2006 | Teague et al. | |
| 2006/0117139 A1 | 6/2006 | Kobayashi et al. | |
| 2006/0159121 A1 | 7/2006 | Sakata et al. | |
| 2006/0198378 A1* | 9/2006 | Rajahalme | 370/395.4 |
| 2006/0274688 A1 | 12/2006 | Maxwell et al. | |
| 2007/0019553 A1 | 1/2007 | Sagfors et al. | |
| 2007/0019599 A1* | 1/2007 | Park et al. | 370/338 |
| 2007/0025301 A1 | 2/2007 | Petersson et al. | |
| 2007/0070894 A1* | 3/2007 | Wang et al. | 370/230 |
| 2007/0143218 A1 | 6/2007 | Vasa | |
| 2007/0230342 A1 | 10/2007 | Skog | |
| 2007/0248048 A1* | 10/2007 | Zhu et al. | 370/329 |
| 2007/0254671 A1* | 11/2007 | Liu | 455/446 |
| 2008/0081637 A1 | 4/2008 | Ishii et al. | |
| 2008/0162713 A1 | 7/2008 | Bowra et al. | |
| 2008/0186912 A1 | 8/2008 | Huomo | |
| 2008/0191816 A1 | 8/2008 | Balachandran et al. | |
| 2008/0195745 A1 | 8/2008 | Bowra et al. | |
| 2008/0212473 A1 | 9/2008 | Sankey et al. | |
| 2008/0273533 A1 | 11/2008 | Deshpande | |
| 2009/0019178 A1 | 1/2009 | Melnyk et al. | |
| 2009/0029644 A1 | 1/2009 | Sue et al. | |
| 2009/0043906 A1 | 2/2009 | Hurst et al. | |
| 2009/0210904 A1 | 8/2009 | Baron et al. | |
| 2010/0023579 A1 | 1/2010 | Chapweske et al. | |
| 2010/0034089 A1* | 2/2010 | Kovvali et al. | 370/235 |
| 2010/0106770 A1 | 4/2010 | Taylor et al. | |
| 2010/0158026 A1 | 6/2010 | Valmikam et al. | |
| 2010/0195602 A1 | 8/2010 | Kovvali et al. | |
| 2010/0254462 A1 | 10/2010 | Friedrich et al. | |
| 2011/0167170 A1 | 7/2011 | Kovvali et al. | |
| 2012/0099533 A1 | 4/2012 | Kovvali et al. | |

FOREIGN PATENT DOCUMENTS

| | | |
|---|---|---|
| CN | 101299770 A | 11/2008 |
| CN | 101310481 A | 11/2008 |
| EP | 1445703 A1 | 8/2004 |
| EP | 1523171 A1 | 4/2005 |
| WO | 2007/016707 A2 | 2/2007 |
| WO | WO 2009/096833 A1 | 8/2009 |
| WO | 2010/017308 A1 | 2/2010 |
| WO | 2010/088490 A1 | 8/2010 |

OTHER PUBLICATIONS

Final Rejection mailed Oct. 29, 2013 in co-pending U.S. Appl. No. 13/048,378.

Final Rejection mailed Nov. 26, 2013 in co-pending U.S. Appl. No. 12/696,378.

International Search Report and Written Opinion mailed Mar. 12, 2010 in co-pending PCT application No. PCT/US10/22542.

International Search Report and Written Opinion mailed May 13, 2011 in co-pending PCT application No. PCT/US11/28477.

European Communication dated Jul. 5, 2012 in co-pending European patent application No. EP 10736460.6.

Chinese Communication dispatched Feb. 16, 2013 in co-pending Chinese patent application No. CN 201080010586.X.

Office Action mailed Oct. 23, 2012 in co-pending U.S. Appl. No. 12/696,378.

Office Action mailed Apr. 30, 2013 in co-pending U.S. Appl. No. 13/048,378.

Notice of Allowance mailed Dec. 23, 2013 in co-pending U.S. Appl. No. 12/696,378.

* cited by examiner

BURST PACKET SCHEDULER FOR IMPROVED RAN EFFICIENCY IN UMTS/HSPA NETWORKS

CROSS-REFERENCE TO RELATED APPLICATIONS

This application claims priority to and the benefit of, co-pending U.S. Provisional Patent Application Ser. No. 61/259,458, filed on Nov. 9, 2009, the disclosures of which are hereby incorporated herein by reference in their entireties.

TECHNICAL FIELD

Embodiments of the invention generally relate to mobile networks and, in particular, to transferring service to a mobile device moving between mobile-network domains.

BACKGROUND

The increasing number of network-connected mobile devices, as well as the increasingly data-intensive applications run on these devices, continue to tax mobile-network infrastructure. As network bandwidth limits are reached, inefficiencies in network architectures and implementations become more apparent. One such inefficiency occurs in scheduling the delivery of packets to and from mobile devices.

In a prior-art general-packet radio service ("GPRS") system such as a universal mobile-telecommunication system ("UMTS"), a gateway GPRS support node ("GGSN") links a packet-switched network, such as the Internet, to the GPRS network. A serving GPRS support node ("SGSN") is disposed one level of hierarchy below the GGSN and delivers packets to and from radio-network controllers ("RNCs") in its geographical area. Each RNC controls one or more base-transceiver stations ("NodeB" stations). In such deployments, the mobile network operates as a transport network and is thus unaware of, for example, user-level TCP/UDP/IP sessions and application protocols above TCP/UDP.

Buffering packets for a plurality of users and selecting specific user packets and scheduling them for delivery over Mobile-Wireless networks based on different criterion is common in Wireless Base Stations (for example NodeB in UMTS and eNodeB in LTE), and Base Station Controllers (RNC in UMTS Network). Some criterion for selecting user packets and allocation of RF channel resources have included, (1) a Round Robin where-in the competing user packets are selected in round-robin fashion to achieve fairness among users, (2) a Max C/I where users with high channel quality are selected first for maximizing the cell throughput, and (3) a Proportional Fair Scheduler (PFS) that attempts a compromise between achieving the maximum cell throughput and fairness, so as not to starve out users with poor RF channel conditions. Packet schedulers incorporating the above packet routing protocols are found in the UMTS/HSPA network, NodeB (Base Station in UMTS network). These schedulers operate on the packets already received or buffered in the corresponding network device, such as NodeB.

The sources of these packets, for example application servers, or client devices use TCP/UDP etc. protocols to transmit packets to the User devices, which get buffered in the transit Network devices, such as NodeB. The packet sources are unaware of the underlying packet transport, and any transit network congestion points such as a congested wireless sector. Closed loop transport protocols, such as TCP, attempt to optimize the packet delivery for a specific User/TCP session to maximize session throughput that the underlying transport could achieve so as to minimize packet drops within the network elements. In the prior art deployments, TCP/UDP etc. application protocols are end to end and do not terminate in RAN or other devices that are closer to the Wireless network. U.S. patent application Ser. No. 12/536,537 (Ref 1) proposes Content Caching/Proxy device in the Radio Access network that is application & content protocol aware.

FIG. 1 illustrates an example of a network 100 that includes a UMTS radio-access network ("RAN"), the packet core network (CN), and the Internet. A GGSN 102 within the CN sends and receives content from a server 104 over the Internet 106. The RAN operates only as a transport network, and application sessions are therefore terminated outside the RAN (in, e.g., the Internet 106). When a mobile device 108 moves from a first position 110 to a second position 112, it leaves the coverage area of a first base-transmitter station 114 and enters the coverage area of a second base-transmitter station 116. RNCs 118, 120 use an inter-RNC logical connection 122 in accordance with industry-standard protocols to hand over control-plane and user-plane sessions to the new RNC 120 and new base-transmitter station 116. The handover in the user plane happens at the transport level, and any packets lost en route to or from the first base-transmitter station 114 via the first RNC 118 are re-transmitted to the mobile device 108 at its new position 112 using the second RNC 120 and the second base-transmitter station 116 (or other, similar recovery operations are performed).

In other examples, the common point in the network between the first position 110 and the second position 112 may be further "downstream" (e.g., if the two base-transmitter stations 114, 116 are managed by a common RNC 118) or farther "upstream" (e.g., if a first SGSN 120 or GGSN 102 manages the first base-transmitter station 114 and a second, different SGSN or GGSN manages the second base-transmitter station 116). Although packets are dropped in the system 100 during a base-transmitter transfer in each case, the higher upstream the common point, the more packets will be dropped and the greater the inefficiency of the transfer.

Existing Third-Generation Partnership Project ("3GPP") standards define different types of mobility and relocation operations when a mobile device moves from the coverage area of the first base-transmitter station 114 (e.g., a NodeB/RNC combination in an UMTS network or an eNodeB in a long-term evolution ("LTE") network) to the second base-transmitter station 116. These operations include intra-NodeB handover, inter-NodeB handover, and inter-RNC handover between two RNCs connected to the same or different SGSNs. The mobility and handover scenarios include soft handover, softer handover, and hard handover. The handover and relocation procedures in the prior-art 3GPP standards operate at the packet-transport level and do not, for example, terminate TCP or UDP sessions.

SUMMARY

The current invention defines an overlay scheduler that is applicable to a transit network device that is operating as a multi-layer edge/proxy device in wireless mobile networks such as UMTS/HSPA (Universal Mobile Telecommunications System/High Speed Packet Access), LTE (Long Term Evolution), and CDMA Networks. For example, one such content edge/proxy may be deployed in RAN (Radio Access Network) on the IuB (1), or IuPS (2) or in CN (Core Network) on the Gn (3) or Gi (4) interfaces in UMTS network shown FIG. 1. U.S. patent application Ser. No. 12/536,537 proposes the deployment of such a content edge/proxy device, termed RAN-Cache in that patent application, in RAN. The overlay scheduler identified in the current invention is a software component that may be incorporated into the RAN-Cache or other proxy devices in mobile network. The example descriptions and the associated figures use the RAN-Cache that incorporates the current invention methods inserted on the IuPs logical interface between the RNC & SGSN in the UMTS network. However the subject matter of the current invention is applicable to the said device placed on other interfaces in the UMTS network or other Wireless mobile networks, such as LTE, CDMA etc.

A method of generating optimal packet workload for achieving a balance between maximizing cell throughput and fairness across multiple users in UMTS/HSPA Network is disclosed. The packet scheduler of the current invention enhances the performance of other schedulers, such as Proportionally Fair Scheduler in NodeB and RNC in UMTS/HSPA Networks by monitoring recent RAN bandwidth to each mobile device, and increasing buffer occupancy of high rate data-flows. The scheduler uses the desired performance goals of maximum cell throughput and fairness at various network congestion levels, and controls egress burst rate while delivering packets to the RAN (Radio Access Network).

According to one embodiment of the invention, a method of scheduling packets within a radio access network (RAN) is provided that is implemented upstream of a Node B within the RAN. The method includes receiving packet streams from a plurality of end users, receiving network parameters, calculating network conditions, and buffering the received packet streams. The method further includes scheduling further transmission of the packet streams with different relative timing and rates than the timing and rates at which those packet streams were received based on the received packet streams and parameters and calculated conditions.

The method may further include writing data into a diffserv field within a packet based on the scheduling. Additionally, the method may provide for a Node B to receive the packet streams, which further schedules the packets for transmission to individual end user devices. The Node B may perform the further scheduling or prioritization based at least in part on data in a diffserv field. The methods may be performed by an overlay scheduler that schedules the received packet streams according to at least cell throughput and fairness goals. The methods may be implemented in UMTS, LTE and CDMA networks and the overlay scheduler may be positioned logically between Node B and a core network. The parameters used in scheduling may include at least one of CQI, end user category, application type and service class, and network configuration and provisioning parameters.

According to another embodiment of the present invention, an overlay scheduler for scheduling packet delivery in a radio access network (RAN) includes a buffer and a scheduler. The buffer is coupled to a RAN and a core network and buffers received packet streams from the core network. The scheduler is coupled to the buffer and receives parameters from the RAN and core network and calculates network conditions and further schedules transmission of the packet streams from the buffer to the RAN with different relative timing and rates than the timing and rates at which those packet streams were received based on the received packet streams, parameters and calculated conditions.

According to still another embodiment of the invention, a method of optimizing transmissions in a wireless radio access network (RAN), includes wherein said method comprises:
 a. Logically inserting a device between a first and second component in said RAN, said device comprising a storage element, control logic and two interface modules, such that said device communicates with both said first and said second component;
 b. Using a first of said interface modules to emulate said first component to said second component;
 c. Using a second of said interface modules to emulate said second component to said first component;
 d. Using said control logic in said device to interpret a communication from said first to said second component, so as to determine the user and the content of said communication, wherein said communication comprises a plurality of protocol layers;
 e. Determining the bandwidth, Bandwidth Quality Index (BQI) and other characteristics associated with said user; and
 f. Modifying the delivery of content to said user so as to maximize the cell utilization.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
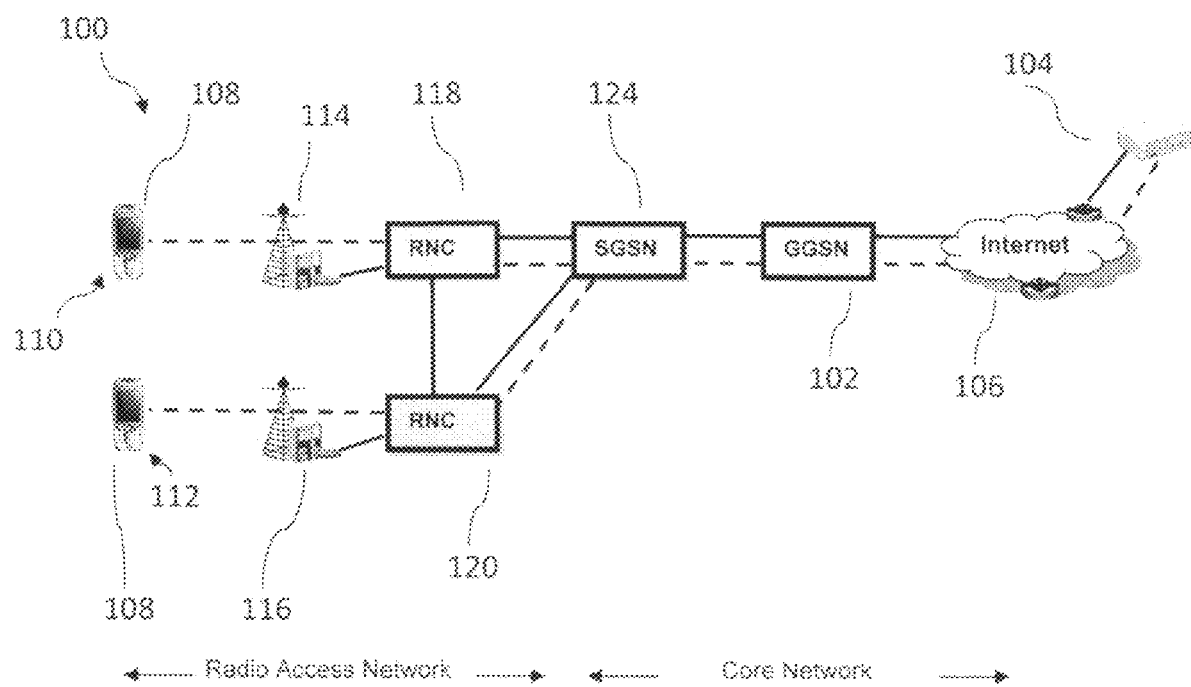
FIG. 1 is a block diagram of a network that includes the Internet and a prior-art RAN.
Figure 2:
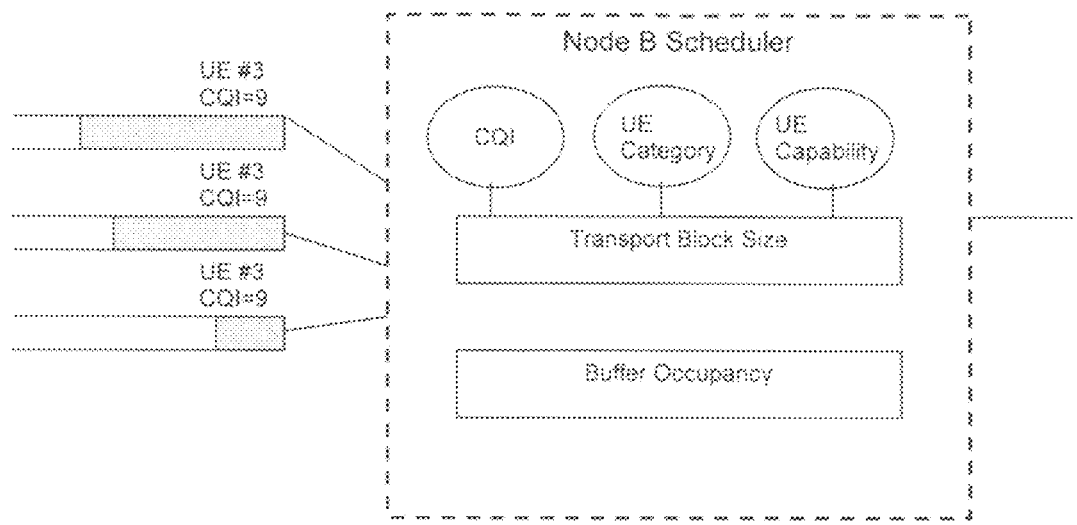
FIG. 2 shows a block diagram of a proportionally fair scheduler in Node B according to the prior art.

FIG. 2 shows an overview of an example scheduler in NodeB of the prior art. The figure shows a Proportionally Fair Scheduler (PFS). The figure shows three packet queues for three users labeled (UE #1, UE #2, and UE #3) as inputs to the NodeB Scheduler. Referring to FIG. 2, it is apparent that the NodeB scheduler uses UE category, UE capability and Channel Quality Index (CQI) to determine the Transport Block Size for each specific UE. In this arrangement, the PFS scheduler attempts to balance between scheduling high-CQI users for Maximum Cell throughput, while ensuring some fairness to low-CQI users when determining which UE packets that are internally buffered to be allocated RF channels for transmission to the mobile devices.

Figure 3:
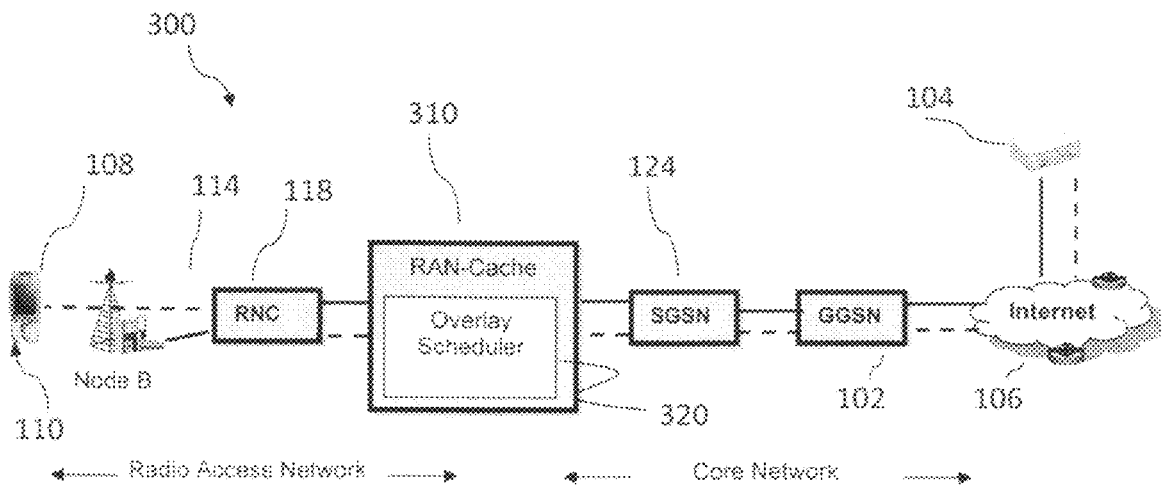
FIG. 3 depicts an illustrative example of a content edge or proxy device that incorporates an overlay packet scheduler according to an embodiment of the present invention.

FIG. 3 shows a RAN 300 that implements an Overlay Scheduler 320 in a RAN-cache 310, according to an embodiment of the invention. Referring to FIG. 3, the GGSN 102 within the CN sends and receives content from a server 104 over the Internet 106. The RAN operates only as a transport network, and application sessions are therefore terminated outside the RAN (in, e.g., the Internet 106). The SGSN exchanges packets with the GGSN and the RAN cache 310, which in turn exchanges packets with the RNC 118. The RNC 118 exchanges packets with Node B and ultimately with end user mobile devices 108 through Node B. As users may be mobile the RNC used to reach the end user may change when the user moves to a different Node B access point, depending on how the network is implemented.

The RAN cache 310 is a content edge/proxy device, implemented, for example, in a UMTS network that is capable of intercepting packets in one of the logical interfaces (the IuPS logical interface). This interface may contain two logical interfaces, the control-plane and user plane. In the user plane, user packets may be carried within GTP-U tunnels with transport headers. Such user plane packets may need to be de-encapsulated for identifying packets that belong to a user device. The RAN cache, according to one embodiment of the invention, incorporates the Overlay Packet Scheduler 320 that schedules packets for transmission according to the present invention. The Overlay Scheduler 320 buffers downstream User Payload packets received from SGSN through the interface between the RAN Cache 310 and the SGSN 124, and controls packet delivery of the locally buffered packets towards the NodeB through the RNC. While the Overlay Packet Scheduler 320 is depicted as a unit within the RAN-cache, it will be understood that the scheduler may be implemented as a stand-alone device with network interfaces that is capable of receiving streams of packets and scheduling the delivery of those packets according to the various embodiments of the scheduler described herein. Additionally, the RAN-cache may be implemented in software and run by other network elements or in other hardware or firmware incorporated into network elements. In general, the Overlay Packet Scheduler operates to control what packets are sent to the RNC and Node B and uses more intelligent scheduling based on end to end context as described herein.

Figure 4:
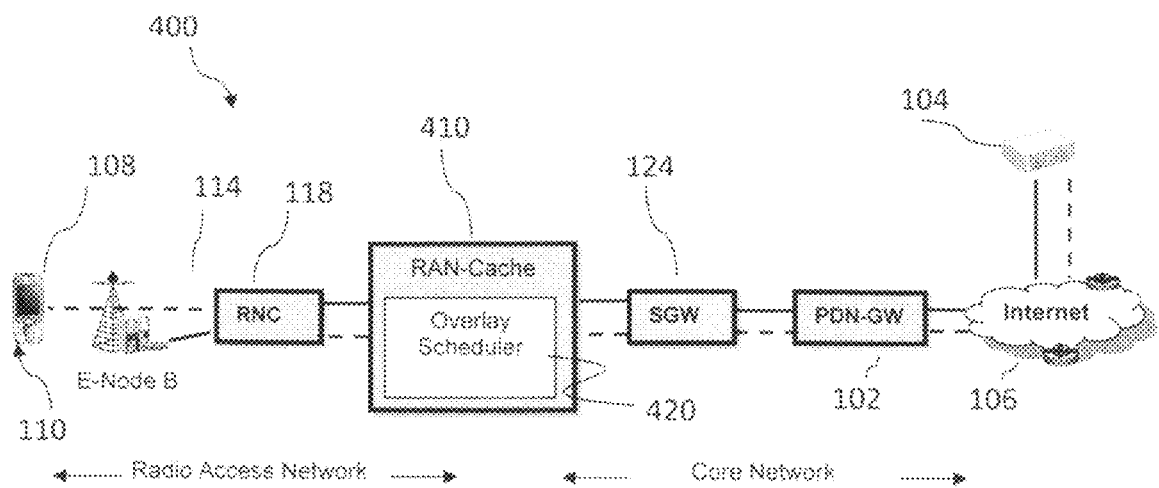
FIG. 4 depicts an illustrative system in which a RAN-cache device incorporating overlay scheduling methods according to one or more embodiments of the invention may find application.

FIG. 4 illustrates a RAN 400 implemented in an illustrative LTE configuration. The RAN 400 includes a RAN-Cache 410 that incorporates an overlay scheduler according to an embodiment of the invention. Referring to FIG. 4, the overlay scheduler may illustratively form part of a RAN-Cache 410, which is coupled between a SGW and E-NodeB and controls the scheduling of packet transmission there between. The Overlay Scheduler may intercept the logical interface termed S1 in LTE architecture between the E-NodeB and MME/SGW. This interface has Control Plane Protocols (S1-C), and User Plane Protocols (S1-U) per 3 GPP Standards. The Overlay Scheduler intercepts packets, buffers and schedules their transmission according to various methods described in detail herein. As described above in connection with the UMTS network, the Overlay Scheduler may be implemented as a stand alone network element or may be implemented in software, firmware or hardware associated with another device including those shown in FIG. 4.

Figure 5:
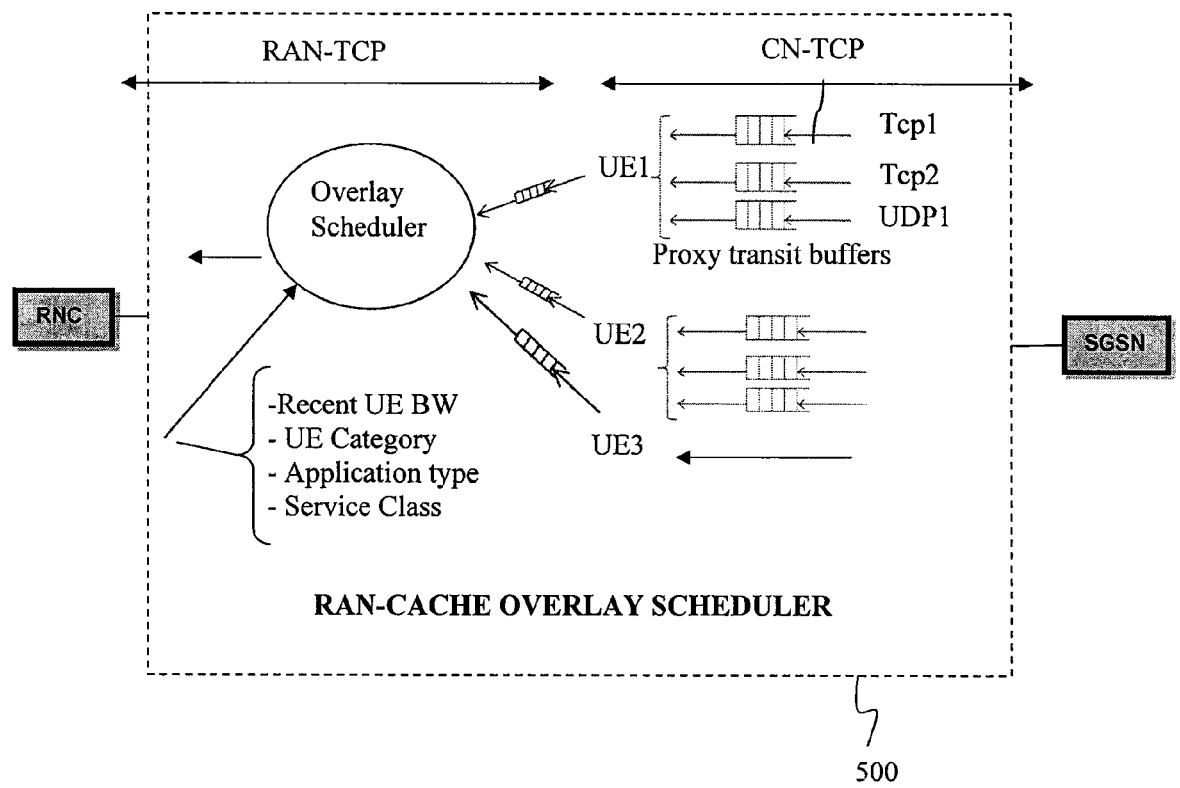
FIG. 5 depicts an internal, operational view of a RAN-Cache incorporating an overlay scheduler, according to an embodiment of the invention.

FIG. 5 depicts an illustrative view of the operation of an Overlay Scheduler 505 acting on various packets and streams (UE1-UE3) of packets associated with end users according to an embodiment of the invention. Referring to FIG. 5, end users actively engaged in the exchange of data with the network are labeled UE1-UE3. Each end user has a plurality of streams of packets associated with him or her and according the streams are grouped per end user. End user UE1, for example, is shown as having three packet streams or flows associated with his device, labeled Tcp1, Tcp2 and UDP1. Since a user device may have plurality of concurrent application sessions (TCP, UDP), the grouping may use destination IP address of the User device and/or the GTP-U tunnel-id to identify the user. Each TCP flow may use a transit TCP buffer (TCP1, TCP2 shown in figure). The TCP flow is generally a reliable data control protocol. Similarly, each UDP flow may use a separate transit buffer to buffer UDP packet traffic, which is generally an unreliable data protocol, generally used to transmit real time data. The traffic of some UEs may be bypassed transparently by a policy configuration in a Proxy/Edge device, such as the RAN-cache.

The Overlay Scheduler 505 may take into account several parameters to aid in scheduling packets for transmission. For example, the Overlay Scheduler 505 may take into account recent UE bandwidth, UE category, Application type associated with streams of packets and service class. The UE bandwidth per end user is computed as sum of bytes for all application flows to a UE in an observation period. The cell or service area of a UE may be determined by monitoring a control plane, and methods of such association is outside the scope of the current invention. The maximum bandwidth of a cell (or sector) may be configured a-priori or estimated from long term history monitored on the interface and may be used as a parameter for scheduling by the Overlay Scheduler 505. The overlay scheduler operates to analyze parameters of the network and each user and sends packet bursts per UE. The overlay scheduler may make scheduling decisions based on previously observed UE BW, content type, type of UE, cell or service area congestion level, and service class (such as Interactive Service class specified when UE's data-session is established). Additional parameters may also be used to control how the Overlay Scheduler 505 schedules packets according to the present invention.

In general, the Overlay Scheduler 505 operates to change the relative timing of transmission of packets or groups of packets as compared to the time of arrival of those packets or groups of packets. It may also adjust the relative timing or packets per unit time for an individual end user or end user stream or of types of streams, such as, for example, scheduling a slow down of video streams when network congestion is high. Any parameter may be used to influence the adjustment of the schedule.

Figure 6:
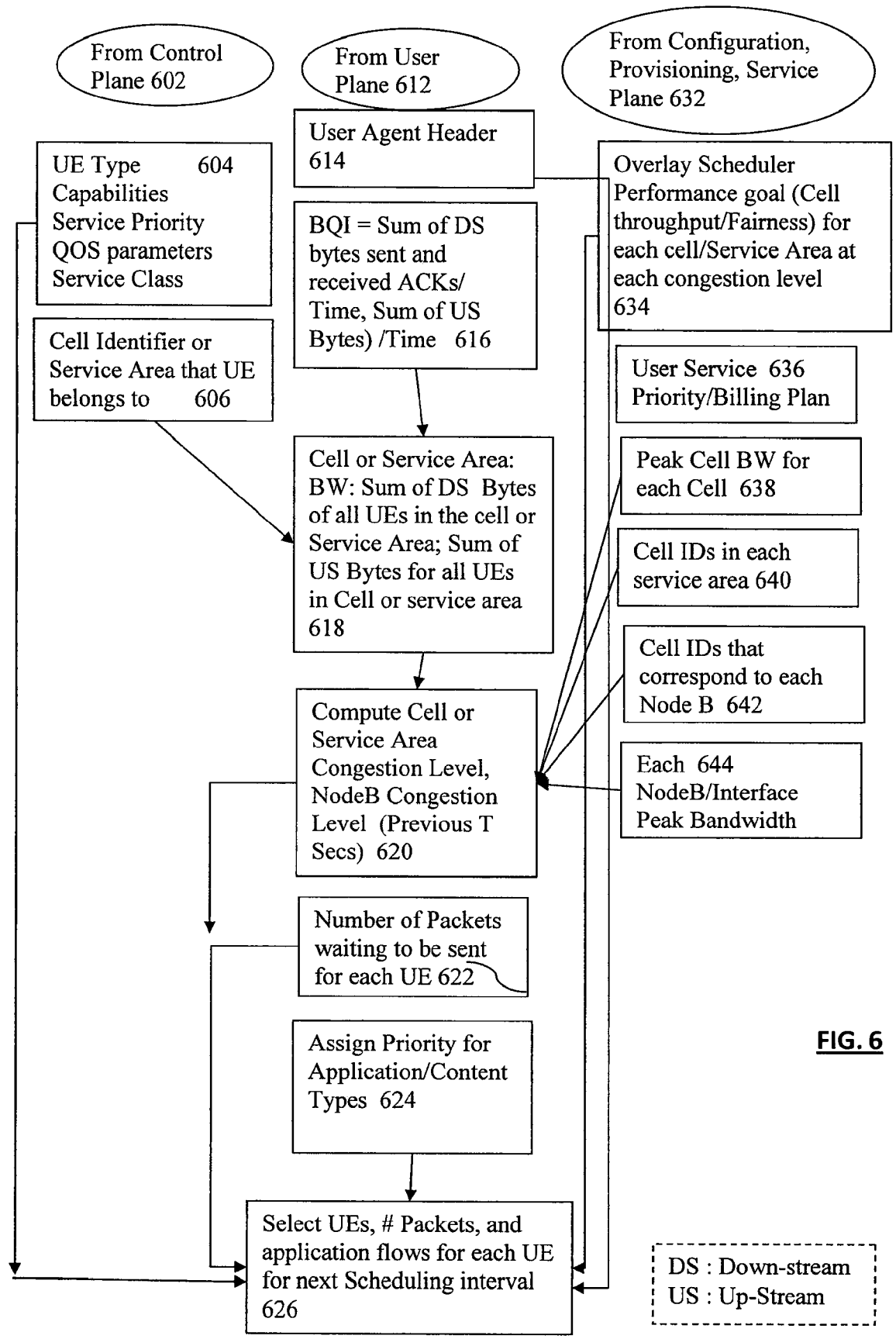
FIG. 6 depicts a method of operating an overlay scheduler according to an embodiment of the invention.

FIG. 6 illustrates an illustrative set of parameters that the overlay scheduler may use while performing scheduling decisions. Referring to FIG. 6, the parameters are shown as associated with a control plane 602, a user plane 612 or from data associated with a configuration or provisioning 632. The attributes learnt from the Control plane 602 may include 604 UE-Type, UE Capabilities, User Service Priority, QOS Parameters such as Maximum Bit Rate (MBR), Guaranteed Bit Rate (GBR), Service Class such as interactive, background class and 606 Cell Identifier or Service Area Identifier that UE is located. The User Plane attributes 612 include a User Agent Header 614 from http request header, BQI parameters 616 computed as sum of downstream bytes sent during the last observation period, Cell or Service Area bandwidth 618 computed as the sum of the downstream bytes of all UEs in the cell or service area. The cell or Service Area Congestion level 620 is computed as a percent of recently observed downstream-bandwidth of cell/service area as percent of maximum configured or long-term observed downstream bandwidth of the cell. Other parameters from the user plane include the number of packets waiting to be sent 622 and a priority 624 assigned for application content types. The overlay scheduler selects UEs per Sector/Service area 618, and the number of packets to be sent per UE for the next scheduling interval 626 based on the configuration, provisioning and service plane parameters 632. The provisioning and service plane parameters 632 include desired performance goals 634 per each congestion level, user service/billing plan parameters 636, peak cell BW for each cell 638, cell IDs in each service area

640, cell IDs that correspond to each Node B 642 and Node B/interface peak bandwidth 644.

The overlay scheduler in the current invention augments the prior art packet schedulers, in NodeB in the UMTS/HSPA RAN by generating packet workloads that feed to the NodeB through transit network elements such as, but not limited to, a RNC. NodeB uses alternative packet schedulers for allocation of radio channel resources to competing mobile devices (termed UE: User Equipment).

Figure 7:
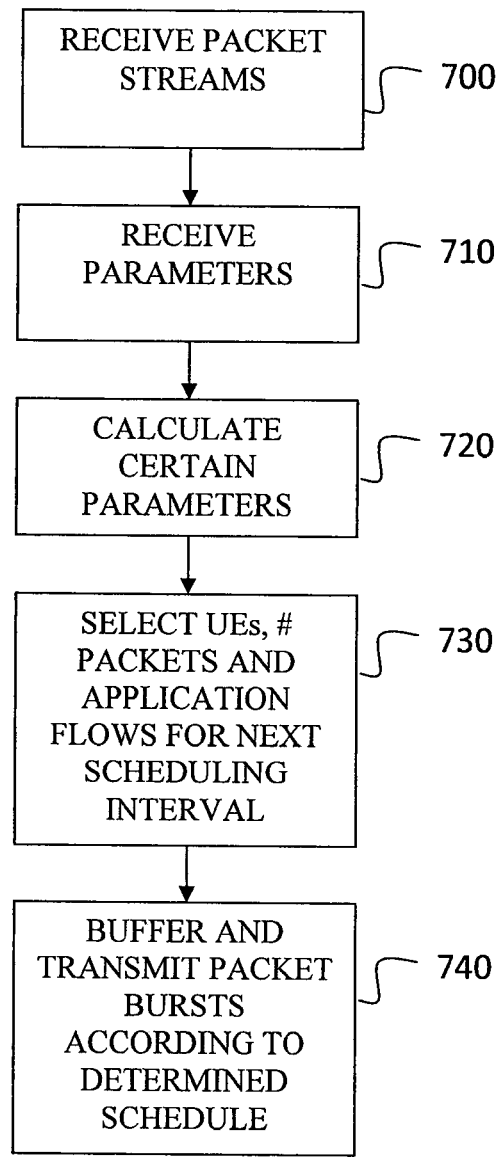
FIG. 7 depicts a method of operating an overlay scheduler according to an embodiment of the invention.

FIG. 7 depicts a method of operating an overlay scheduler in a RAN according to an embodiment of the invention. Referring to FIG. 7, in step 700 the overlay scheduler receives Packet streams. These streams may be end user streams or control or other streams. In step 710, the overlay scheduler receives parameters that relate to scheduling. These parameters may be received from a control plane of a RAN or other source, from a user plane or from a configuration, provisioning or service definition that is stored locally, received from another location via a network, for example, or otherwise associated with the RAN network being scheduled.

In step 720, the overlay scheduler calculates certain parameters desired for use in scheduling. This step may include calculating UE bandwidth per user and several other parameters described herein that the overlay scheduler may determine based on calculations performed on packets transmitted through the scheduler or on parameters received from other network elements, including the RAN cache. In step 730, the overlay scheduler determines the schedule for the next scheduling interval by, for example, determining the UEs whose packets will be transmitted, and determining the packet and application flows for the next scheduling interval. In step 740, the overlay scheduler buffers received packets and transmits packets and/or packet bursts according to the determined schedule for the scheduling interval.

The NodeB scheduler per prior-art may assign RF channels to UEs, based on, (1) UE Category, (2) CQI, which is a measure of the current RF conditions that the UE is experiencing, (3) UE Priority, (4) Service Type, and (5) Buffer occupancy which defines the packets waiting to be transmitted to the specific UE. At every Transmit Time Interval (TTI), the scheduler transmits packets to the selected UEs based on the scheduling policy. The Transport Block Size (TBS) defines the maximum number of bits per UE category based on a specific CQI. For example for category 10 UE, at CQI value of 25, the transport block size is 14411 bits which corresponds to a Maximum Bandwidth of 7.2 Mbps. The NodeB scheduler prioritizes UEs with high CQI that have packets waiting to be sent to it. Therefore, if there are no (or few) packets to be transmitted to the UE in Node B for a UE with high CQI, the scheduler will select UEs with lower CQIs, which compromises maximum cell throughput. Similarly, if the number of packets buffered for a UE with a certain CQI is inadequate to consume the associated TBS, RAN usage will be sub-optimal. In other words, UEs with high CQIs maximize cell throughput, as the packets could be transmitted with higher transport block sizes and fewer retransmissions are required. However, when a high CQI UE has less packets destined for it, the scheduler will select a lower CQI device.

The overlay scheduler of current invention generates packet workloads to feed the NodeB scheduler through one or more transit network devices for optimal performance.

It is envisioned that the methods disclosed herein are incorporated into a proxy device such as a RAN-Cache described in U.S. patent application Ser. No. 12/536,537 incorporated by reference herein. Thus, the overlay scheduler may be co-located with an application proxy, such as HTTP Proxy/Cache, or a TCP Proxy, that splits the end to end client-server flows, as (1) Client to Proxy, and (2) Proxy to Server flows with transit flow buffers. In general, the overlay scheduler works with a buffer that stores packet streams and allows the packets and streams to be pulled out at times different than their arrival at the buffer. The overlay scheduler optimizes delivery from the transit flow buffers to the mobile devices. The overlay scheduler is application aware (HTTP, FTP, MAIL, etc.), and content-type aware (html objects, video objects etc.), and is driven by the cell throughput vs. fairness goals at different congestion levels.

FIG. 6 details major flows that drive the scheduler. As described earlier and in U.S. patent application Ser. No. 12/536,537, incorporated by reference herein, the RANC is operating as a content cache/proxy device with per user/application level transit buffers between the RAN to RANC and RANC to CN (core network). CN-RTT is the RTT (Round Trip Time) between the server to the RANC and RAN-RTT is the RTT between the client and RANC. Thus, the proxy transit buffers in the RANC are filled using TCP and bandwidth variations of the Client in the RAN are isolated from propagating to the server by using the transit buffers. Thus the transit buffers in the proxy per tcp application using the CN-TCP are filled faster than they are transmitted over RAN using RAN-TCP. The overlay packet scheduler incorporated within RANC services the packets from the transit buffers to achieve optimal performance as configured at various levels of congestion in the RAN. It maintains an observation interval "T", and computes the total bytes transmitted per cell (or SAI/LAI). It may use for example, a multiple of the 2 milliseconds Transmit Time Interval that a UMTS/HSPA NodeB uses as observation/scheduling interval for bandwidth computations. However, any other convenient interval, including a variable interval, may be used. It limits the total numbers of packets for all the UEs in a cell area so as not to exceed the maximum capacity of the cell area.

Additional and illustrative operational details are discussed below:

1) For each UE, the Overlay Scheduler estimates the recent bandwidth to the mobile client, by computing the packets transmitted and acknowledged by the client in the last observation period.

2) Alternatively, the overlay scheduler estimates the bandwidth to the UE by measuring the round-trip time for the recently established TCP connection.

3) From snooping control plane protocols on the IuPS interface, or by identifying the user agent within the HTTP Request headers, RANC identifies the UE Category, and UE Type. The category identifies peak bandwidth (Number of HS-PDSCH codes supported by UE). The UE type indicates whether it is a datacard connected to a laptop, or a smart phone, or a featured phone etc.

4) From the above two estimates, the overlay scheduler may compute the Bandwidth Quality Index (BQI) which estimates the BW that the UE could support in the next scheduling interval.

5) Since the RANC is operating as a content proxy, it is aware of the type of application, and for certain applications, such as HTTP, it may determine the amount of data to be sent and its priority during the next interval.

6) From the application types (UDP and TCP Port Numbers), and the content types of multiple flows of UE, it assigns priorities for flows; for example, prioritizing DNS packets.

7) From snooping the control plane protocols (for example, IuPS as in FIG. 2), it determines the UE's service priority.

8) The overlay scheduler uses maximum cell capacity for each of the cells covered by the RNC that it is connected to. It also uses mappings of cells to location area identifiers that they belong to. These parameters are configured a priori in the RANC.

9) RNC propagates the Service Area Identifier or Location Area Identifier where a mobile device is located when it attaches to the network through the control plane messages. This communication uses "initial UE message" which contains the Service Area Identifier (SAD, Location Area Identifier (LAI), and Routing Area Identifier (RAI). In some operator network deployments, the LAI corresponds to LAI and SAI corresponds to RNC. Thus in such deployments, the RANC device that is snooping control plane messages identifies the sector where the user is located. In other network deployments the LAI/SAI/RAI identifiers may be mapped differently and may correspond to a group of sectors. In the following descriptions, the term "cell area" corresponds to specific sector or SAI/LAI/RAI and the granularity may be a sector or group of sectors depending on the network configuration.

10) RANC identifies the cell area of each UE and groups all the UEs with active packet flows and bandwidth usage by all UEs in previous observation interval. This value as a percent of the configured peak cell bandwidth of the cell in Step 6 above determines the congestion level of the cell area (Cell or SAI/LAI/RAI).

11) In a LTE network, the Radio Access Network is flattened with the E-NodeB performing some of the RNC and NodeB functions. In these deployments as described in U.S. patent application Ser. No. 12/536,537, the RAN-Cache intercepts S1 control (S1-C) and user plane (S1-U) protocols. In the user plane protocols each user's application packets (IP/TCP/UDP etc.) are carried within a GTP-U tunnel specific to the User Device. The GTP-U tunnel packets are carried within IP Transport packets where IP transport header contains the IP address or the E-NodeB, and the SGW. Thus when deployed in a LTE network, RANC identifies the E-NodeB (BTS in LTE) that a UE belongs to and groups all the UEs in the scope of one E-NodeB, and their bandwidth usage. In such deployments, RANC estimates E-NodeB congestion level from the user plane.

12) The overlay scheduler uses the desired balance between the cell throughput and fairness at various congestion levels as input configuration parameters. For example, at high congestion levels it could be configured to limit bandwidth for high throughput/high BQI UEs to increase fairness and network reachability to a larger number of UEs.

13) The overlay scheduler generates packet bursts depending on the BQI, to achieve optimal buffer occupancy in NodeB so that the packet scheduler in NodeB uses optimal transport block size for each UE's CQI thus facilitating optimal allocation of RF Channel resources for maximum efficiency.

14) The burst scheduling for a UE reduces time of using RF and Radio Access Bearers (smaller time at a higher BW & higher RF efficiency compared to longer time with a lower BW & lower efficiency), thus making the resources available to other devices in the sector.

15) The overlay scheduler may also affect the scheduling priority used by RAN devices for specific UE by over-writing the DiffServ bits in the UE IP Header fields. Some RNC and NodeB implementations derive Traffic Handling Priority (THP) priority for UEs from the DiffServ bits in the IP header.

16) An alternative to setting the DiffServ bits as in Step 12 above, the overlay scheduler in RAN-Cache may modify the RAB (Radio Access Bearer) to alter the THP for the specific UE flow through Control Plane Protocol depending on the control plane logical interface that it is intercepting.

17) Depending on the actual deployment, and the operator's network configuration, all the input parameters for the overlay scheduler may not be available. In such cases, the scheduling decision may be sub-optimal compared to the case if all the parameters are available.

EXAMPLES

Example 1

Overlay Scheduler Improving Cell Throughput when a Cell or Service Area is Below a Congestion Threshold Using Policy configuration step 632 in FIG. 6, an operator configures the per Cell/Service Area congestion threshold below which the Overlay scheduler should attempt to increase cell or /SAI/LAI throughput by increasing packet bursts for selective UEs. The operator configures peak Bandwidth of each of the Cell/SAI/LAIs in the scope of the overlay scheduler. Whether the policy is enforced per Cell or SAI/LAI is operator network dependent and chosen accordingly. As explained earlier in certain network deployments, the Service Area ID/Location Area ID (SAI/LAI) is unique for each sector, and when the RAN-Cache that incorporates the current invention methods receives an "Initial UE Message" in an IuPS control plane, the SAI/LAI informational elements in the message correspond to a sector. In other network deployments, the SAI/LAI informational elements correspond to a group of sectors. The following steps outline illustrative steps that the overlay scheduler may use for scheduling UE packets to be transmitted on the IuPS logical interface to the RAN.

1. When "Initial-UE" message is observed in the control plane, it determines the cell area that UE belongs to.

2. The total throughput per sector is determined from the total number of downstream bytes sent to all UEs in a cell area, as shown in Step 618, FIG. 6. The cell area congestion is determined as a percent of observed throughput in the previous observation period compared to maximum cell area throughput. The estimated cell area congestion is compared to the configured policy thresholds to determine whether the traffic in the cell area is below threshold before activating the following steps.

3. The bandwidth achieved to a UE in the observation interval is computed from total number of downstream bytes sent to the UE. Alternatively the bandwidth to the UE is computed from the latest TCP connection setup messages. Since the RAN-cache device where the overlay scheduler is incorporated, is working as a TCP Proxy and Caching device, it is terminating TCP connections to the UE and uses a different TCP connection to the server as shown in FIG. 5. Thus it computes the roundtrip time between sending the TCP-SYN-ACK it sent to the UE, and the ACK or the first application packet received for this application. It computes the bandwidth as a total of bytes in TCP-SYN-ACK and ACK or the first application packet divided by the round-trip time.

4. It determines the UE category from monitoring the IuPS control plane messages. The maximum bandwidth that the UE could support is dependent on the UE category. From the UE category it determines the maximum transport block size that the UE could support, and the maximum bandwidth that is achievable with the said transport block size. This bandwidth defines the maximum short term bandwidth (burst bandwidth) that the overlay scheduler could use for this UE.

5. It computes the Band Width Quality Index (BQI) as a ratio of observed bandwidth in step 1 above to the maximum bandwidth that the UE could support as determined in Step 2. The BQI is always <1.

6. From the maximum transport block size in step 2, and transmit schedule interval "T", it computes the maximum number of bytes that it could send to UE. It determines the number of packets (packet burst size) to be sent for a specific UE per time T from the BQI and the UE maximum transport block size.

7. While servicing UE queues at the next transmit opportunity, it increases packet bursts for UEs with higher BQI. Since BQI is recently estimated bandwidth to the UE, and cell (or SAI/LAI) throughput is below a configured congestion threshold, increasing the packet burst attempts increase per UE bandwidth. This in turn increases buffered packets at NodeB, thus allowing NodeB to use higher transport block sizes.

8. Additionally the overlay scheduler may also affect the scheduling priority used by RAN devices (RNC, NodeB) of UEs identified in Step 7 above by over-writing the DiffServ bits of one or more application flows in the user level IP Header fields. Some RNC and NodeB implementations derive Traffic Handling Priority (THP) priority for UEs from the DiffServ bits in the IP header.

Example 2

Overlay Scheduler Increasing Fairness when a Cell or Service Area is Approaching Congestion Similar to the previous example, the Policy configuration step 632 in FIG. 6, determines per cell area congestion threshold at which the Overlay Scheduler should start controlling users consuming high bandwidth to increase fairness and network availability for a number of users. The operator configures peak cell area (Sector or group of sectors within SAI/LAI/RAI) bandwidth. As already explained in the previous example whether the policy is enforced per sector or is network configuration dependent.

1. Similar to the previous example, the Overlay Scheduler computes the total throughput per cell area in the observation period "T", and checks if the cell area reached configuration threshold before activating the fairness steps outlined below.

2. As explained in previous example, the bandwidth delivered to a UE in the observation interval, the peak bandwidth the UE could support, and the BQI are computed.

3. For UEs consuming high bandwidth in the cell area, it attempts to reduce the bandwidth by reducing the number of packets sent per the scheduling interval T, based on computed BQI. The reduced packet burst per UE increases RTT as seen by one or more active TCP applications of the UE, thus causing application sources to slow down. This gives opportunities for other UEs to gain fairer share of the cell area.

4. In addition to or as an alternative to number of packets sent for UE consuming high bandwidth, the overlay scheduler may affect the scheduling priority used by RAN devices (RNC, NodeB) of UEs identified in Step 3 above by over-writing the DiffServ bits of one or more application flows in the user level IP Header fields. Some RNC and NodeB implementations derive Traffic Handling Priority (THP) priority for UEs from the DiffServ bits in the IP header. This increases the fairness for other UEs competing for RAN resources.

5. As an alternative to over-writing the DiffServe bits for the specific UE application flows, the overlay schedule may modify the traffic handling priority (THP) in the RAN by setting the THP parameter in RAB Parameters information Element in the "RAB Assignment Request" sent by the CN device to the RNC.

It should also be noted that the various hardware-based implementations described above are illustrative only. Embodiments of the present invention may be provided as one or more computer programs embodied on or in one or more articles of manufacture. The article of manufacture may be any suitable computer-readable medium, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture. Moreover, the computer programs may be distributed over various intercommunicating hardware elements (e.g., network nodes in a radio-access network).

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of scheduling packets within a radio access network (RAN), wherein the method is implemented in a transit network device upstream of a Node B within the RAN, comprising:
   receiving packet streams from a plurality of end users;
   receiving operator configured network parameters;
   calculating network conditions;
   buffering the received packet streams, separating per user packet streams, and scheduling further transmission of the packet streams with different relative timing and rates than the timing and rates at which those packet streams were received based on the received packet streams and parameters and calculated conditions;
   writing data into a diffserv field within a user payload packet header based on the scheduling decision prior to the further transmission; and
   wherein a Node B receives the packet stream after the further transmission and further schedules the packets for transmission to individual end user devices.

2. The method according to claim 1, wherein the method is performed by an overlay scheduler upstream of at least one other scheduler in a radio access network.

3. The method according to claim 2, wherein the overlay scheduler schedules the received packet streams according to at least cell throughput and fairness goals.

4. The method according to claim 3, wherein the RAN is a UMTS network.

5. The method according to claim 3, wherein the RAN is a LTE network.

6. The method according to claim 3, wherein the overlay scheduler is positioned logically between Node B and a core network.

7. The method according to claim 3, wherein the parameters include at least one of estimated channel quality index (CQI) from observed bandwidth history when CQI is not available, end user category, application type and service class.

8. The method according to claim 3, wherein the parameters further include at least one of network configuration and provisioning parameters.

9. An overlay scheduler for scheduling packet delivery in a radio access network (RAN) in a transit network device upstream of a Node B within the RAN comprising:
a buffer coupled to a RAN and a core network buffering received packet streams from the core network;
a scheduler coupled to the buffer, the scheduler receiving parameters from the RAN and core network and calculating network conditions, the scheduler further scheduling transmission of the per user packet streams from the buffer to the RAN with different relative timing and rates than the timing and rates at which those packet streams were received based on the received packet streams and parameters and calculated conditions and the scheduler writing data into a diffserv field within a user payload packet header based on the scheduling decisions prior to transmission of the user packet to a Node B.

10. The scheduler according to claim 9, wherein a Node B receives the packet streams after the further transmission and further schedules the packets for transmission to individual end user devices.

11. The scheduler according to claim 10, wherein the Node B performs the further scheduling the packet for transmission based at least in part on data in the diffserv field.

12. The scheduler according to claim 9, wherein the scheduler is implemented as a stand alone overlay scheduler device.

13. The scheduler according to claim 9, wherein the scheduler is implemented as part of a RAN-cache.

14. The scheduler according to claim 9, wherein the overlay scheduler schedules the received packet streams according to at least cell throughput and fairness goals.

15. The scheduler according to claim 14, wherein the RAN is a UMTS network.

16. The scheduler according to claim 14, wherein the RAN is a LTE network.

17. The scheduler according to claim 14, wherein the overlay scheduler is positioned logically between Node B and a core network.

18. The scheduler according to claim 14, wherein the parameters include at least one of CQI when available or estimated CQI, end user category, application type and service class.

19. The scheduler according to claim 14, wherein the parameters further include at least one of network configuration and provisioning parameters.

20. A method of optimizing transmissions in a wireless radio access network (RAN), wherein said RAN services a plurality of users, and comprises a plurality of components, wherein said method comprises:
a. Logically inserting a device between a first and second component in said RAN, said device comprising a storage element, control logic and two interface modules, such that said device communicates with both said first and said second component;
b. Using a first of said interface modules to emulate said first component to said second component;
c. Using a second of said interface modules to emulate said second component to said first component;
d. Using said control logic in said device to interpret a communication from said first to said second component, so as to determine the user and the content of said communication, wherein said communication comprises a plurality of protocol layers;
e. Determining the bandwidth, Bandwidth Quality Index (BQI) and other characteristics associated with said user, wherein BQI is calculated based on recently observed bandwidth usage of said user and a category of equipment used by said user, as determined based on control plane messages associated with said user; and
f. Modifying the delivery of content to said user based at least in part on BQI so as to maximize the cell utilization.

21. The method of claim 20, wherein said modification of content comprises altering the delivery rate of packets to said user.

22. The method of claim 20, wherein said modification of content comprises deleting high bandwidth applications from being transmitted to said user.

23. A method of scheduling packets within a radio access network (RAN), wherein the method is implemented in a transit network device upstream of a Node B within the RAN, comprising:
receiving packet streams from a plurality of end users;
receiving network parameters;
calculating network conditions;
buffering the received packet streams, separating per user packet streams, and scheduling further transmission of the packet streams with different relative timing and rates than the timing and rates at which those packet streams were received based on the received packet streams and parameters and calculated conditions; and
writing data into a diffserv field within a user payload packet header based on the scheduling decision prior to transmission of the user packet to a Node B.

24. A method of scheduling packets within a radio access network (RAN), wherein the method is implemented in a transit network device upstream of a Node B within the RAN, comprising:
receiving packet streams from a plurality of end users;
receiving network parameters;
calculating network conditions, including a bandwidth quality index (BQI) associated with at least one user, wherein BQI is calculated based on recently observed bandwidth usage of said user and a category of equipment used by said user, as determined based on control plane messages associated with said user; and
buffering the received packet streams, separating per user packet streams, and scheduling further transmission of the packet streams with different relative timing and rates than the timing and rates at which those packet streams were received based on the received packet streams and parameters and calculated conditions, including based on a BQI associated with at least one user.

* * * * *